US008296039B2

(12) United States Patent
Böhnig et al.

(10) Patent No.: US 8,296,039 B2

(45) Date of Patent: Oct. 23, 2012

(54) METHOD AND DEVICE FOR THE ROBUST ESTIMATION OF THE RATIO OF INJECTION CONTROL PARAMETERS TO RESULTANT INJECTED FUEL QUANTITY

(75) Inventors: Ralf Böhnig, Lengfeld (DE); Michael Hardt, Madrid (ES)

(73) Assignee: Continental Automotive GmbH, Hannover (DE)

(*) Notice: Subject to any disclaimer, the term of this patent is extended or adjusted under 35 U.S.C. 154(b) by 786 days.

(21) Appl. No.: 12/279,784

(22) PCT Filed: Feb. 19, 2007

(86) PCT No.: PCT/EP2007/051556

§ 371 (c)(1), (2), (4) Date: Aug. 18, 2008

(87) PCT Pub. No.: WO2007/096328

PCT Pub. Date: Aug. 30, 2007

(65) Prior Publication Data

US 2009/0024307 A1 Jan. 22, 2009

(30) Foreign Application Priority Data

Feb. 20, 2006 (DE) ........................ 10 2006 007 786

(51) Int. Cl.

*G01F 9/00* (2006.01)
*G21C 17/00* (2006.01)
*G06F 11/00* (2006.01)

(52) U.S. Cl. ..................... 701/104; 73/114.48; 702/182; 702/183; 702/187

(58) Field of Classification Search .................. 123/486, 123/478, 480, 488; 701/103, 104, 114, 105, 701/115; 73/114.45, 114.46, 114.47, 114.48, 73/114.49, 114.51; 702/183, 186, 187, 182

See application file for complete search history.

(56) References Cited

U.S. PATENT DOCUMENTS

| | | | | |
|---|---|---|---|---|
| 4,619,234 | A | 10/1986 | Okamoto | 123/357 |
| 6,561,164 | B1 * | 5/2003 | Mollin | 123/446 |
| 6,681,745 | B2 | 1/2004 | Hozuki | 123/486 |
| 6,725,147 | B2 * | 4/2004 | Mollin | 701/104 |
| 6,904,354 | B2 * | 6/2005 | Kuegel et al. | 701/104 |

FOREIGN PATENT DOCUMENTS

| | | |
|---|---|---|
| DE | 10327533 | 1/2004 |
| EP | 0145993 | 11/1984 |
| JP | 60006044 | 1/1985 |
| JP | 61087941 | 5/1986 |
| JP | 1155042 | 6/1989 |
| JP | 4321741 | 11/1992 |
| JP | 6173732 | 6/1994 |

OTHER PUBLICATIONS

International Search Report and Written Opinion; PCT/EP2007/051556; pp. 11, Dated Jul. 5, 2007.

* cited by examiner

*Primary Examiner* — Stephen K Cronin
*Assistant Examiner* — Raza Najmuddin
(74) *Attorney, Agent, or Firm* — King & Spalding L.L.P.

(57) ABSTRACT

In a method for estimating at least one control parameter of an injection system in an internal combustion engine for a target injection quantity, the estimation of the control parameter is based on linear regression, which is determined between predefined grid points and calculated test points in an operating range of the injection system.

4 Claims, 3 Drawing Sheets

METHOD AND DEVICE FOR THE ROBUST ESTIMATION OF THE RATIO OF INJECTION CONTROL PARAMETERS TO RESULTANT INJECTED FUEL QUANTITY

CROSS-REFERENCE TO RELATED APPLICATIONS

This application is a U.S. national stage application of International Application No. PCT/EP2007/051556 filed Feb. 19, 2007, which designates the United States of America, and claims priority to German application number 10 2006 007 786.5 filed Feb. 20, 2006, the contents of which are hereby incorporated by reference in their entirety.

TECHNICAL FIELD

The present invention relates to a method and device for estimating a characteristic diagram of an injection system in an internal combustion engine for injection control. In particular, the invention relates to a method for estimating at least one control parameter for a target injection quantity.

BACKGROUND

The precise estimation of small quantities of injected fuel is necessary in order to adjust the injection parameters of the injection system precisely to the area of small injection quantities. This forms the basis for the ability to inject a requested quantity of fuel consistently and reliably so that the new European emission standards for new vehicles can be observed. In this context it should be noted that undesired emissions from internal combustion engines are particularly sensitive to imprecise setting of injection parameters in the area of small injection quantities.

Most motor vehicles have a crankshaft sensor which records the angular velocity of the crankshaft. This variable provides an excellent source for deducing dynamic values derivable from individual combustion events in the cylinder. Previous technical arrangements have employed high-resolution noise measurement in the engine with the aid of one or more microphones or knock sensors. These are attached to the engine unit near the cylinder. According to a further alternative, cylinder pressure measurements are taken with the aid of a cylinder pressure sensor. Cylinder pressure sensors may be arranged in various positions inside the cylinder. However, both approaches have the disadvantage that they are not installed in motor vehicles as standard and therefore increase the manufacturing costs of the vehicle substantially.

Known approaches from the prior art for estimating injection control parameters include the estimating of an isolated point according to an actuation time of an electrical injection system in which combustion can be recorded (cf. DE 198 09 173 AI and DE 199 45 618 A1). Another method tries to estimate the torque resulting from an isolated injection. This approach can also be used to assign the injection parameters to the injected fuel quantities in an open control loop. This approach also involves the assignment being based or estimated on several different points in order to thus provide greater precision. However, the method has the disadvantage that the information from the estimated points is not used jointly.

Other approaches in turn describe the adjustment of energy supplied to a piezo-injection system instead of the adjustment of an actuation time to the injection system in order to thus identify and correct the assignment of the injection parameters to individual injection quantities. All these approaches are based on injected fuel quantities or torques being determined from isolated injections by estimating the speed signals of the crankshaft or the signals of the crankshaft sensor in the internal combustion engine.

SUMMARY

In order to be able to comply with the ever lower threshold values of modern emission standards, it is necessary to provide a more precise method compared with the prior art for estimating a control parameter of an injection system in an internal combustion engine.

According to an embodiment, a method for estimating at least one control parameter of an injection system in an internal combustion engine for a target injection quantity, may comprise the following steps: a) Determining at least one injection control grid with a plurality of grid points described by at least one grid parameter and one grid injection quantity in each case, while the injection control grid describes an operating range of the injection system, b) Determining at least one or a plurality of test points based on at least one or a plurality of isolated test injections of the injection system, while the test points are described by at least one test parameter and one test injection quantity in each case, and c) Estimating the control parameter of a target injection quantity with the aid of restricted linear regression between grid points and test points within at least one partial area of the operating range of the injection system.

According to a further embodiment, the method may further comprise the step of generating the test points until a number of test points is arranged within a tolerance range around the target injection quantity or a number of iterations is achieved via the test points. According to a further embodiment, the method may further comprise the step of generating two linear equations from grid points and test points which approach an interval around the target injection quantity from different sides. According to a further embodiment, the method may further comprise the step of determining the control parameter of the target injection quantity based on the marginal condition that the two linear equations meet at the level of the target injection quantity in the operating range of the injection system.

According to another embodiment, a device for estimating at least one control parameter of an injection system in an internal combustion engine for a target injection quantity may comprise: a unit to determine at least one injection control grid with a plurality of grid points which are described by at least one grid parameter and one grid injection quantity in each case, while the injection control grid describes an operating range of the injection system, a unit to determine at least one or more test points based on at least one or a plurality of isolated test injections of the injection system, while the test points are described by at least one test parameter and one test injection quantity in each case, and a unit to estimate the control parameter of a target injection quantity with the aid of restricted linear regression between grid points and test points within at least one partial area of the operating range of the injection system.

BRIEF DESCRIPTION OF THE DRAWINGS

Embodiments are explained in more detail with reference to the accompanying drawing. The drawing shows.

DETAILED DESCRIPTION

Figure 1:
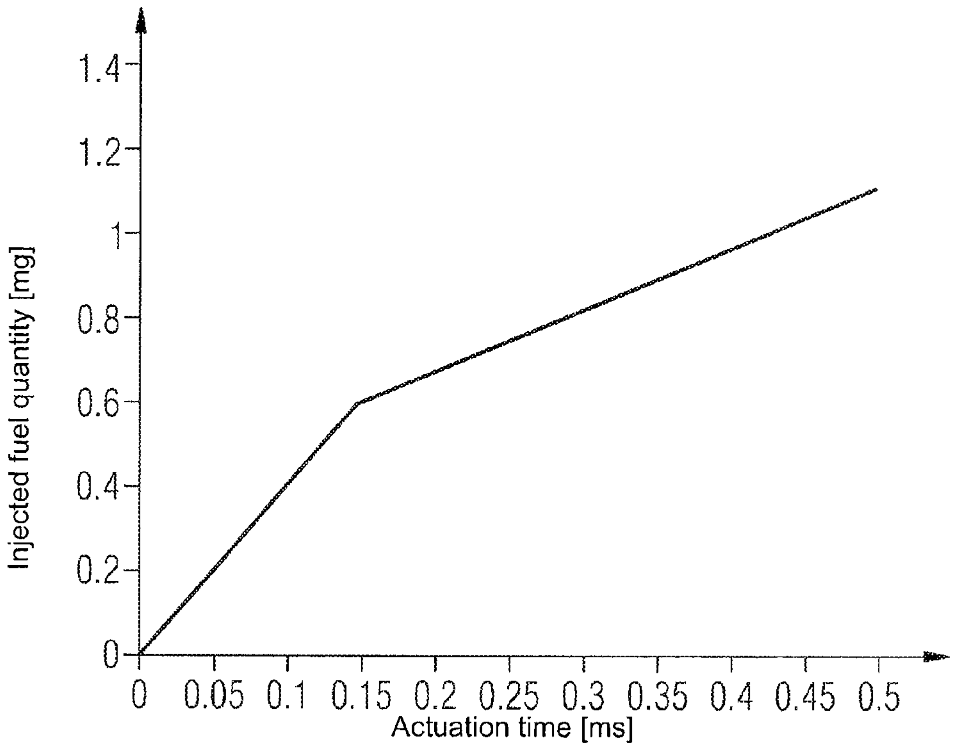
FIG. 1 shows an exemplary program to describe an injection system which is characterized by a partially linear progression to describe the ratio between actuation time of the injection system and injection quantity.

The method or device according to various embodiments for estimating at least one control parameter of an injection system in an internal combustion engine for a target injection quantity may comprise the following steps: Determination of an injection control grid with a plurality of grid points described by at least one grid parameter and one grid injection quantity, while the injection control grid describes an operating range of the injection system, determination of at least one test point based on at least one isolated test injection of the injection system, while at least one test point is described by at least one test parameter and one test injection quantity in each case, and estimation of the control parameter of a target injection quantity with the aid of restricted linear regression between grid points and test points within at least one partial area of the operating range of the injection system.

The method is initially based on an injection control grid which, for example, is formed by initial calibration of the injection system in the internal combustion engine. This injection control grid covers all or part of the entire operating range of the injection system. It is spanned by individual grid points whose coordinates are characterized by at least one parameter of the injection system, the grid parameter, and an injection quantity assigned to the grid parameter, the grid injection quantity. These grid points provide a rough estimate of the operating range of the injection system, i.e. they provide individual injection parameters in the form of grid parameters with which certain injection quantities can be obtained in the form of grid injection quantities.

In order to be able to estimate the control parameters of a target injection quantity, at least one test point or a plurality of test points are generated inside the injection control grid. These test points, which in similar fashion to the grid points are characterized by one test parameter assigned to the injection system and one test injection quantity assigned to the test parameter respectively, are generated with the help of isolated test injections. Such isolated test injections denote small quantities of fuel compared with the normal coasting mode of the internal combustion engine, which are injected into the individual cylinders of the internal combustion engine in phases of disconnected fuel supply. Combustion of the isolated test injections generates analyzable torque fluctuations from which the actual injected fuel quantity can be derived. With the aid of this procedure an actual test injection quantity is assigned to a predefined test parameter. Such a method is described, for example, in the as yet unpublished patent application DE 10 2006 006 303.1.

After both a plurality of grid points and at least one or a plurality of test points are available, linear regression between the selected test point(s) and grid point(s) is performed so that the control parameter of a target injection quantity can be estimated using the linear regression obtained in the form of a linear equation. In order to make finding the control parameter of the target injection quantity easier, such a linear equation or linear regression is determined for at least part of the operating range of the injection system. The grid points and at least one test point for the at least one linear equation may be selected preferably such that both the linear equations or restricted linear regressions approach the desired target injection quantity from different sides, preferably from approximately opposite sides. Thus, the better the test points approach the desired target injection quantities with the isolated test injections, the more precisely the estimation of the target injection quantity and the assigned control parameter can take place with the aid of linear regressions between the grid points and these test points.

According to an embodiment, the above test points are generated until a number of test points within a tolerance range which is arranged around the target injection quantity, or a minimum number of iterations are achieved via the test points.

According to a further embodiment, determination of the control parameter of the target injection quantity takes place on the basis of the marginal condition that the two linear equations or linear regressions meet at the level of the target injection quantity in the operating range of the injection system.

According to various embodiments, an estimation of the control parameters p of an injection system for internal combustion engines is described. This means that in an open control loop individual estimates for control values or parameters p and other influencing variables $u_j$ of fuel injection are provided as a function of injected fuel quantities m.

$$p=g(m, u_1, u_2, \dots)$$

The control parameters in this open control loop include, for example, the actuation time, the actuation voltage or energy and all the other parameters of the injection system which have an influence on the injected fuel quantity. The function g in vehicle applications is usually an interpolation table defined via calibration and based on a finite grid of fuel quantities and other influencing variables of injection.

For example, there are $n_m$ grid points for fuel quantities and $n_j$ grid points for every additional influencing variable $u_j$. It is known that the function g is not constant over the entire lifetime of the injection system on account of ageing of the injection system. Adjustment of g in a closed control loop is therefore necessary in order to ensure precise injection of the fuel quantities. The adaptation strategy in a closed control loop presented here adapts each individual point in the grid so that in total there are $n=n_m \times n_1 \times n_2 \times \dots$ grid points.

Measuring points or test points are recorded by determining the resultant injected fuel quantities m from recorded p and $u_j$.

Various measurements or tests are performed in which p is used repeatedly in a certain way until either the measured fuel quantity m is sufficiently close to the sought point or a maximum number of iterations has been passed through. A feature of the approach described below is that while using the adjacent grid points, one measurement or test point is sufficient to provide a precise estimate of the control parameter based on the set value of the injection quantity.

The various embodiments are based on the knowledge that characteristic lines in the characteristic diagram to control injection are piecewise linear in an approximation. This is represented as an example in FIG. 1. The abscissa in FIG. 1 describes the electrical actuation time or injection time in milliseconds (ms), while the ordinate displays the injected fuel quantity in milligrams (mg). It can be detected from the curve that the relationship between injection parameter and injected fuel quantity can be approximated by means of a piecewise linear course of the curve.

If according to various embodiments, techniques of restricted linear regression are applied to at least one selected partial area of the operating range of the injection system, injection parameters can be estimated in comparison to the prior art with greater precision. In at least one selected partial area of the operating range of the injection system injected fuel quantities and corresponding parameters are approximated with the aid of linear models restricted section-by-section and the method of the smallest error squares.

Figure 2:
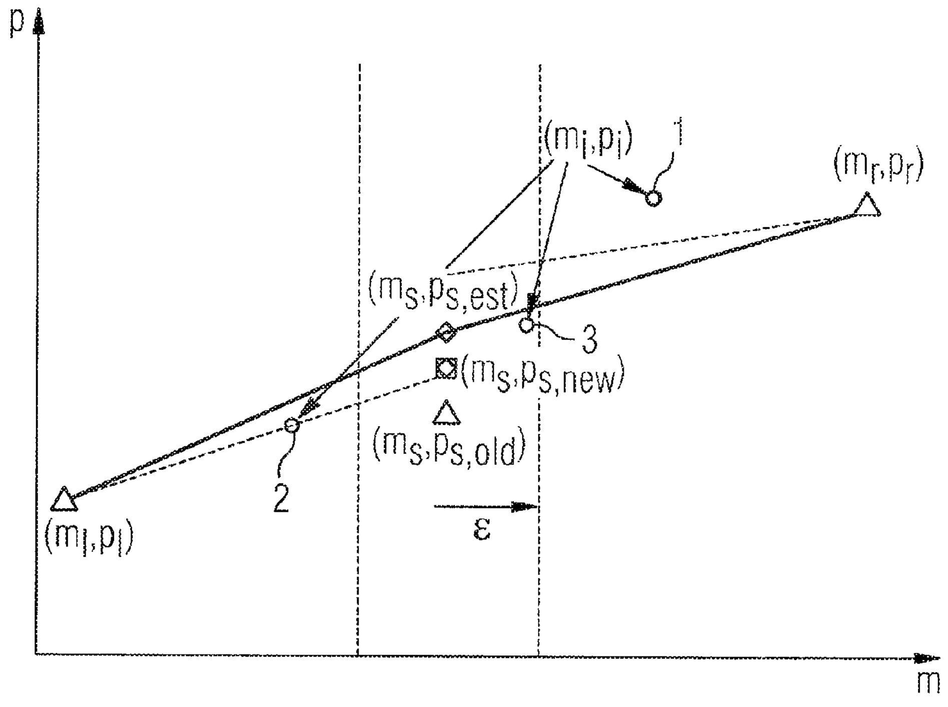
FIG. 2 shows an exemplary piecewise linear regression for estimating the control parameter of a target injection quantity.

An adjustment problem is displayed as an example in FIG. 2. An update for the parameter $p_s$ of the fuel quantity set value $m_s$ is sought. A cross-section through the injection control characteristic diagram is considered, by keeping the variables $u_j$ constant and adjusting each injection quantity set value in the grid individually. The advantage of this adjustment strategy is that adjacent injection quantity grid values $m_j$, $m_r$ and the corresponding stored injection parameters $p_l$ and $p_r$ are used to contribute to estimating the function g, i.e. for example of the injection parameter $p_s$, for the sought fuel quantity set values $m_s$. In this way a new estimate of the injection parameter $p_{s,\ est}$ is calculated from the set value of the injection quantity $m_s$ using the measurement values or test values $m_i$ for the tested injection control parameters $p_i$, i=1, 2, 3.

The final new control parameter $p_{new}$ may differ from the updated or estimated control parameter $p_{est}$. This is because the updated control parameter $p_{est}$ does not simply replace the old control parameter $P_{old}$ of this injection quantity set value. Instead the new control parameter $p_{new}$ is calculated as a weighted average of the old control parameter $p_{old}$ and the updated control parameter $p_{est}$. This combination is also explained below.

First a control grid with a plurality of grid points in an injection quantity area of interest is determined in the operating range of the injection system. The grid points are identified by at least one grid parameter, i.e. a control parameter (see above) of the injection system, and a corresponding grid injection quantity. Such a grid corresponds, for example, to a basic calibration of the injection system in which corresponding grid parameters are assigned to various grid injection quantities. Such grid points are represented by triangles in FIG. 2.

Furthermore, for the injection quantity of 1 mg of fuel, for example, an estimate of the corresponding control parameter of the injection system is sought. This target injection quantity of 1 mg of fuel and the corresponding control parameter are represented by the square symbol in FIG. 2 by way of example.

In order to be able to estimate the control parameter, in addition to the existing grid points (triangular symbols in FIG. 2) in the operating range of the injection system a plurality of test points is determined. The test points, which are represented by circles in FIG. 2, should where possible be in the local range of the target injection quantity (square symbol in FIG. 2). The test points are created with the help of isolated injections. In other words, in phases of disconnected fuel supply, test injections are injected into the cylinders of the internal combustion engine and ignited by specifying test parameters. The torque generated by the combustion is evaluated with the help of the crankshaft sensor so that the actual test injection quantity injected can be determined. In this way the actual test injection quantities injected are assigned to the test parameters so that a plurality of test points is generated (cf. circular symbols in FIG. 2). The generation of test points is described in detail in the as yet unpublished patent application DE 10 2006 006 303.1.

According to an embodiment the test points are generated in a local range $\epsilon$ of the target injection quantity. With an exemplary target injection quantity of 1 mg of fuel the local range $\epsilon$ denotes the area demarcated in FIG. 2 by vertical lines around the aforementioned target injection quantity. If the test points are in the local range $\epsilon$, a more precise estimate of the control parameter for the target injection quantity is supported thereby.

To ascertain the test points with the aid of isolated injections, it is possible to process equidistant test parameters successively by means of isolated injections and to determine the corresponding test injection quantities. According to a further embodiment, the following procedure may be preferred. According to test point 1 (cf. FIG. 2) the test injection quantity of 1.3 mg was determined for the predetermined test parameter 1.15. In order to optimize the determination of the test points, the test parameters starting from test point 1 are not reduced, for example, step-by-step by 0.05 until the corresponding injection quantities are in the local range $\epsilon$. Instead an immediate attempt is made to select the subsequent test parameter (cf. for example, test point 3 in FIG. 2) in such a way that the newly generated test point is at a greater distance in terms of parameters and is immediately in the local range $\epsilon$ of the target injection quantity. This procedure shortens the measuring time for estimating the control parameter and reduces the data volume to be estimated at test points. Moreover, according to an embodiment the iterations described below would be finished as soon as the last of the successively generated test points 1, 2, 3, i.e. test point 3, was in the $\epsilon$-interval.

As soon as a plurality of grid points and at least one or a plurality of test points are available, the control parameter of a target injection quantity is estimated with the aid of restricted linear regression between grid points and test points within at least one partial area of the operating range of the injection system. For this purpose, the coordinates of the grid points shown in FIG. 2 are indicated by ($m_l$, $p_l$) (left grid point) and ($m_r$, $p_r$) (right grid point). $a_l$ indicates the slope within a linear equation, the straight line of which represents a linear regression through the left grid point ($m_l$, $p_l$) and the test point 2 (cf. FIG. 2). $a_r$ indicates the slope within the linear equation, the straight line of which represents a linear regression through the right grid point ($m_r$, $p_r$) and the test points 1 and 2. $m_s$ indicates the target injection quantity of, for example, 1 mg of fuel, for which an estimate of the corresponding control parameter $p_s$ is sought. For both the aforementioned straight lines of the linear equations through the aforementioned grid points and test points, the broken lines in FIG. 2 result. These are described mathematically by equation (1):

$$p=a_l(m-m_l)+p_l,\ m\leqq m_s,$$

$$p=-a_r(m_r-m)+p_r,\ m\geqq m_s, \tag{1}$$

The broken lines in FIG. 2 do not meet the marginal conditions discussed below that the straight lines meet in the point of the target injection quantity.

The control parameter should be determined with the aid of restricted linear regression by the existing test points ($m_l$, $p_l$). On the one hand, the total of the error squares $$\sum_i (p-p_i)^2$$

is minimized in the process. On the other hand, the linear equations to be found should meet the marginal condition that they meet in the point of the target injection quantity $m_s$ and of the corresponding control parameter $p_s$. This marginal connection is represented in the following equations (2).

$$p_s=a_l(m_s-m_l)+p_l,$$

$$p_s=-a_r(m_r-m_s)+p_r. \quad (2)$$

The solution to a restricted linear regression problem $Y=X\beta$ with unknown parameters $\beta$ and the marginal conditions $r=R\beta$ is determined with the aid of Lagrange techniques. These are summarized by way of example in the equations (3).

$$\beta=(X^TX)^{-1}X^TY$$

$$\beta_r=\beta+(X^TX)^{-1}R^T[R(X^TX)^{-1}R^T]^{-1}(r-R\beta) \quad (3)$$

$Y_r=X\beta_r$ provides the solution taking into consideration the marginal conditions. In this application a distinction is drawn as to whether a measured point $m_i$ is on the left or the right side of the target injection quantity $m_s$. Each measuring point ($m_i$, $p_i$) then indicates a line $Y_i$ in the vector Y and a line $X_i$ in the matrix X, as shown in the equations (4).

$$Y_i=(p_i-p_l)I_{\{m_i<m_s\}}+(p_r-p_i)I_{\{m_i\geq m_s\}}$$

$$X_i=[(m_i-m_l)I_{\{m_i<m_s\}}(m_r-m_i)I_{\{m_i\geq m_s\}}] \quad (4)$$

In the equations (4) $I_{\{A\}}$ is equal to 1 if the equation or inequation A is met, and equal to 0 if it is not met. The remaining values are defined as:

$$\beta=[a_la_r]^T,$$

$$R=f(m_s-m_l)-(m_r-m_s)], \quad (5)$$

$$r=p_r-p_l.$$

Furthermore, if $$d_l=(m_s-m_l), \quad (6)$$

$$d_r=-(m_r-m_s),$$

$$S_{xxl}=\sum_i (m_i-m_l)^2 I_{\{m_i<m_s\}},$$

$$S_{xyl}=\sum_i (m_i-m_l)(p_i-p_l)I_{\{m_i<m_s\}},$$

$$S_{xxr}=\sum_i (m_r-m_l)^2 I_{\{m_i\geq m_s\}},$$

$$S_{xyr}=\sum_i (m_r-m_i)(p_r-p_i)I_{\{m_i\geq m_s\}}.$$

the estimate of the control parameter $p_s$ is $$a_l=S_{xyl}/S_{xxl}, \quad (7)$$

$$a_r=S_{xyr}/S_{xxr},$$

$$e_l=r-R\beta=p_r-p_l-d_rm_r-d_lm_l,$$

$$a_{lr}=a_l+e_l\bigg/\left(d_l+\frac{d_r^2S_{xxl}}{d_lS_{xxx}}\right),$$

$$p_s=p_l+a_{lr}d_l.$$

The variable $a_{lr}$ indicates the slope restricted by the marginal conditions which belongs to the restricted optimum solution $\beta_r-[a_{lr}\ a_{rr}]^T$. As can be discerned from the above equations, only the calculation of one of the unknown parameters is necessary, since the result emerges from the marginal condition. The straight line of the linear equation for estimating the control parameter and taking into account the marginal condition is represented in FIG. 2 by a continuous line.

After successful estimation of a control parameter $p_{s,\,old}$ for a target injection quantity $m_s$, it is conceivable that after a certain operating time the injection system of the internal combustion engine will be asked for a new estimate of the control parameter for the same target injection quantity $m_s$. Such a new estimate provides the control parameter $p_{s,\,new}$ for the target injection quantity $m_s$, which corresponds to the previous injection quantity $m_{s,\,old}$. In order to ensure lower sensitivity of this estimate, the old values ($m_{s,\,old}$, $p_{s,\,old}$) are not simply replaced by the new values ($m_{s,\,new}$, $p_{s,\,new}$). Instead a weighted combination of the old values ($m_s$, $p_{s,\,old}$) is made with the new values ($m_s$, $p_{s,\,new}$). The spread or variance of the measured values $s^2(y)$ is then calculated in accordance with the following equation $$p_{s,new}=\alpha(s^2(y))p_s+(1-\alpha(s^2(y)))p_{s,old}, \quad (8).$$

Within the equation (8), $\alpha(\cdot)$ describes a non-linear function.

Figure 3:
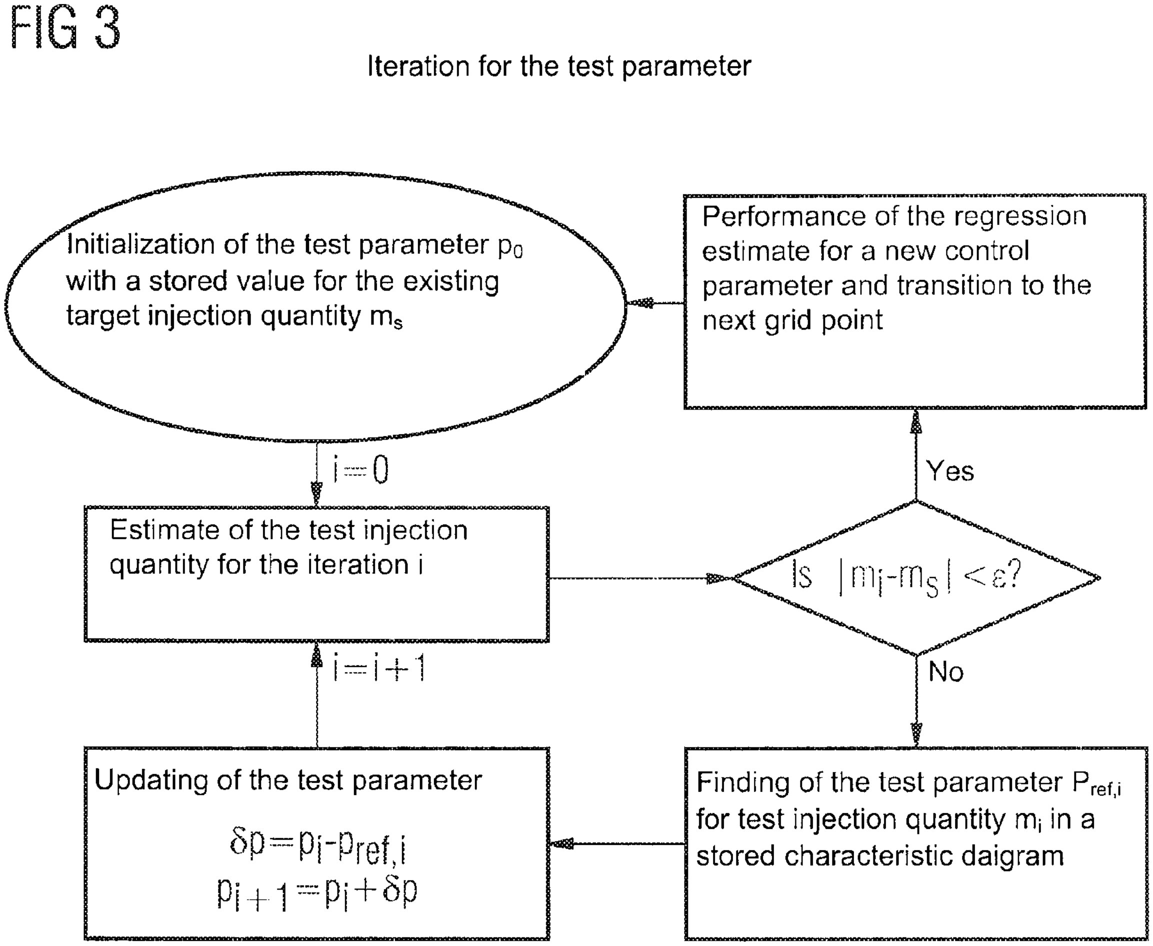
FIG. 3 shows a flow chart of an embodiment for determining control parameters of a target injection quantity of an injection system in an internal combustion engine.

With reference to the flow chart in FIG. 3, the adjustment of the fuel injection quantity $m_s$ to the injection control grid is considered. Adjustment begins with the inspection of the calibrated values stored in the characteristic diagram or in the characteristic curve. Therefore, the first control value to be examined is $p_0=p_{s,\,old}$. A series of test injections is performed and an estimate obtained for the test injection quantity $m_0$.

Figure 4:
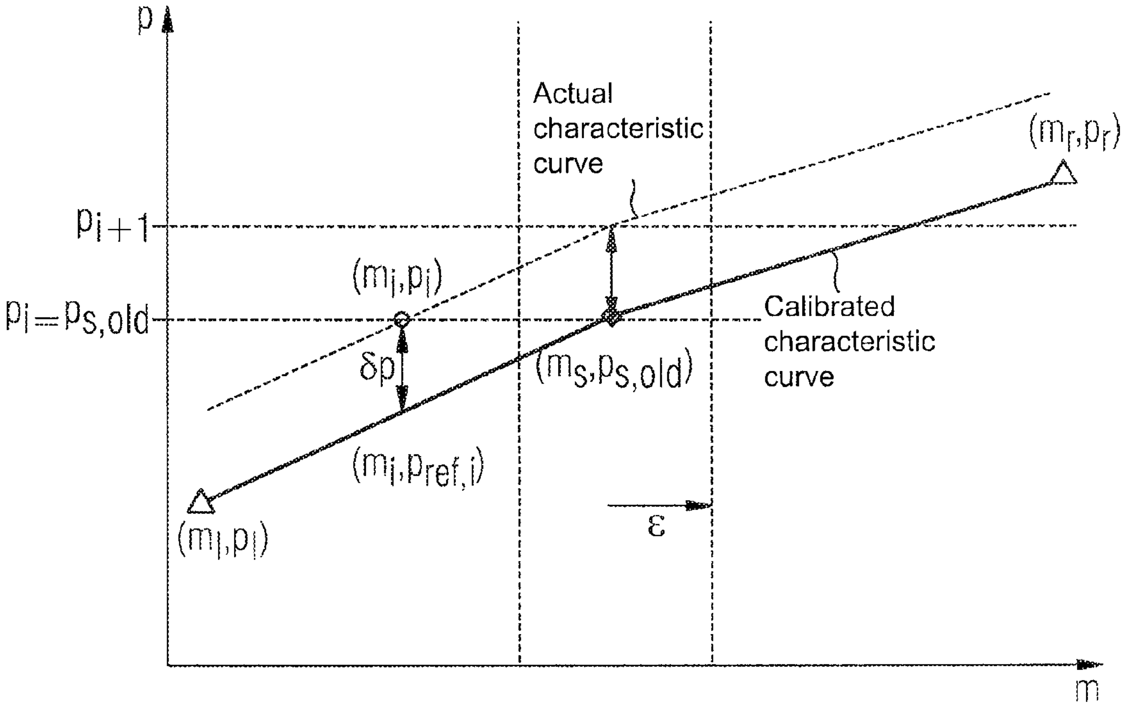
FIG. 4 shows an exemplary iteration of the control parameters.

$m_0$ usually deviates from $m_s$. If $m_0$ is around $m_s$ in the $\epsilon$-interval (cf. FIG. 4), then the adjustment is finished and the restricted linear regression applied. However, if $m_0$ is further away from $m_s$, the slope in the calibrated characteristic diagram is used to determine the next injection control parameter to be tested. It is assumed that the actual characteristic curve or the actual characteristic diagram displays an identical slope in comparison to the calibrated characteristic curve or the calibrated characteristic diagram but is displaced by a parallel shift in relation to the calibrated characteristic curve. Furthermore, it is assumed that the estimate of the test injection quantity obtained is on the actual characteristic curve. In this case the ideal control parameter to test is $p_1=p_0+\delta p$. $\delta p=p_0-p_{ref,\,i}$ and $p_{ref,\,i}$ designates the value on the calibrated characteristic curve which corresponds to $m_0$. This correlation is shown in FIG. 4.

If both the preceding assumptions are correct and the new injection quantity estimate lies on the actual characteristic curve, then $m_i=m_s$. In general, noise and numerical errors prevent this match. However, the approach guarantees a rapid convergence at the set value, while in many cases only one iteration is necessary in order to approximate the set value.

The iterations can be ended when a tolerance level is reached, such as for example $|m_i-m_s|<\epsilon$, or if a certain number of iterations has been performed. As soon as the end of the iteration process is achieved, the above restricted linear regression scheme is applied to the collective statistical values. In this way a new estimate of a control parameter is obtained for the set value of an injection quantity. In the latter case, however, a minimum of two measured points is necessary. This process is summarized again in diagrammatic form in FIG. 4.

The invention claimed is:

1. A method for estimating at least one control parameter of an injection system in an internal combustion engine for a target injection quantity, the method comprising the following steps:

determining, by a processor, at least one injection control grid with a plurality of grid points, each described by at least one grid parameter and one grid injection quantity, wherein the injection control grid describes an operating range of the injection system, performing at least one isolated test injection by injecting fuel into the internal combustion engine according to at least one test parameter, determining, by the processor, at least one test point based on results of the at least one isolated test injection, each test point being described by at least one test parameter and one test injection quantity, generating, by the processor, a first linear equation based on a restricted linear regression of a first grid point and one or more test points, the first linear equation defining a first line segment extending from a first grid point and approaching an interval around the target injection quantity from a first direction, generating, by the processor, a second linear equation based on a restricted linear regression of a second grid point and one or more test points, the second linear equation defining a second line segment extending from a second grid point and approaching an interval around the target injection quantity from a second direction generally opposite the first direction, wherein the first and second line segments have different slopes, determining, by the processor, an intersection point of the first and second line segments having different slopes, the intersection point defining an estimated value for the control parameter of the target injection quantity, and determining, by the processor, a new value for the control parameter of the target injection quantity based on the determined estimated value for the control parameter of the target injection quantity.

2. The method according to claim 1, further comprising the step of:

generating, by the processor, the test points until a number of test points is arranged within a tolerance range around the target injection quantity or a number of iterations is achieved via the test points.

3. A device for estimating at least one control parameter of an injection system in an internal combustion engine for a target injection quantity comprising:

a processor programmed to determine at least one injection control grid with a plurality of grid points which are described by at least one grid parameter and one grid injection quantity, wherein the injection control grid describes an operating range of the injection system, a fuel injection system for performing at least one isolated test injection by injecting fuel into the internal combustion engine according to at least one test parameter, the processor further programmed to:

determine at least one test point based on results of the at least one isolated test injection, each test point being described by at least one test parameter and one test injection quantity, generate a first linear equation based on a restricted linear regression of a first grid point and one or more test points, the first linear equation defining a first line segment extending from a first grid point and approaching an interval around the target injection quantity from a first direction, generate a second linear equation based on a restricted linear regression of a second grid point and one or more test points, the second linear equation defining a second line segment extending from a second grid point and approaching an interval around the target injection quantity from a second direction generally opposite the first direction, wherein the first and second line segments have different slopes, determining, by the processor, an intersection point of the first and second line segments having different slopes, the intersection point defining an estimated value for the control parameter of the target injection quantity, and determine, by the processor, a new value or the control parameter of the target injection quantity based on the determined estimated value for the control parameter of the target injection quantity.

4. The device according to claim 3, the processor further programmed to generate the test points until a number of test points is arranged within a tolerance range around the target injection quantity or a number of iterations is achieved via the test points.

* * * * *